Nov. 20, 1962 H. G. GENTRY 3,064,405
APPARATUS AND METHOD FOR ENCLOSING ARTICLES
IN PAPERBOARD CARTON STRUCTURES
Filed Feb. 19, 1960 10 Sheets-Sheet 1

INVENTOR.
HERMOND G. GENTRY
BY
Parrott & Richards
ATTORNEYS

INVENTOR.
HERMOND G. GENTRY
BY
Parrott & Richards
ATTORNEYS

INVENTOR.
HERMOND G. GENTRY
BY
Parrott & Richards
ATTORNEYS

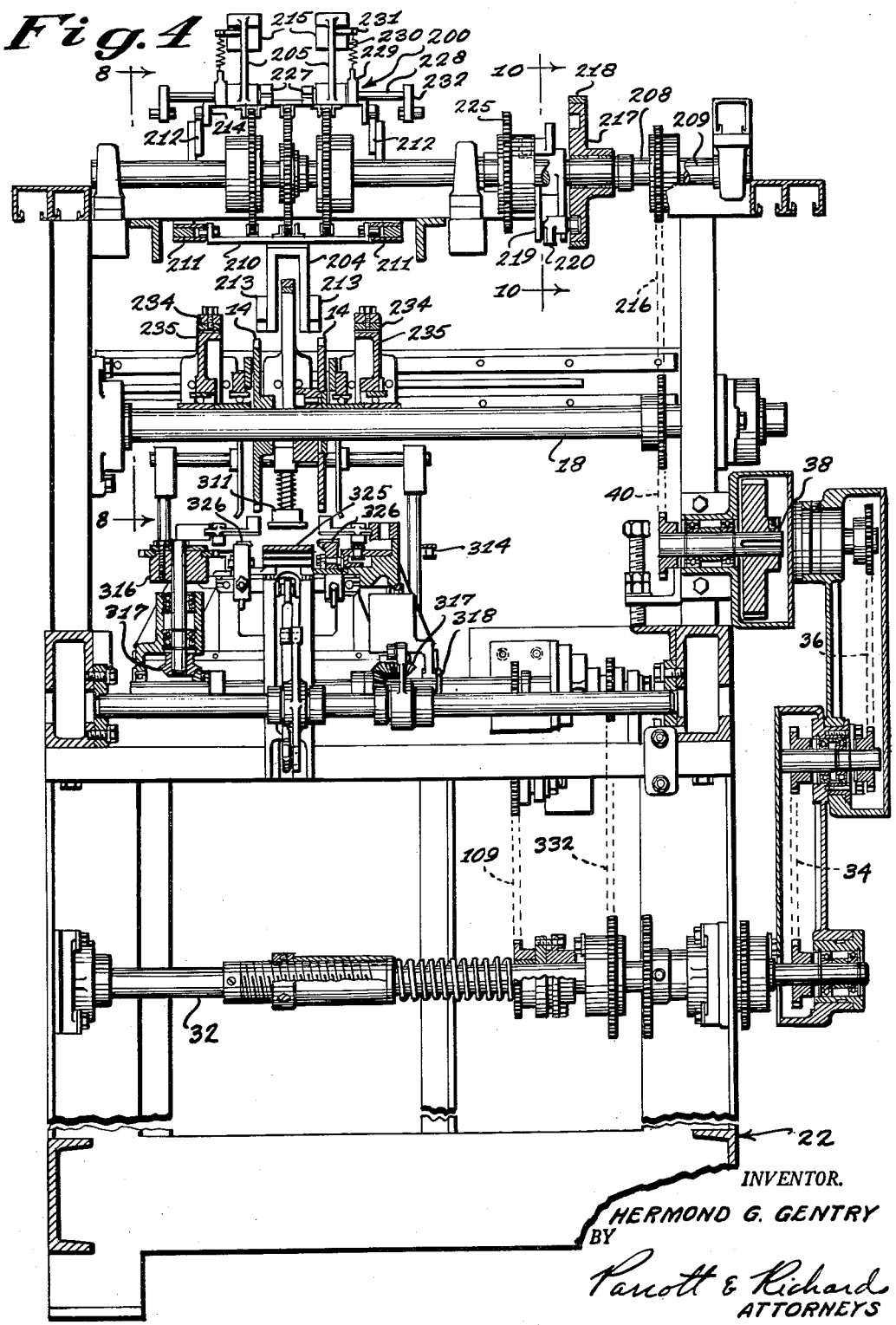

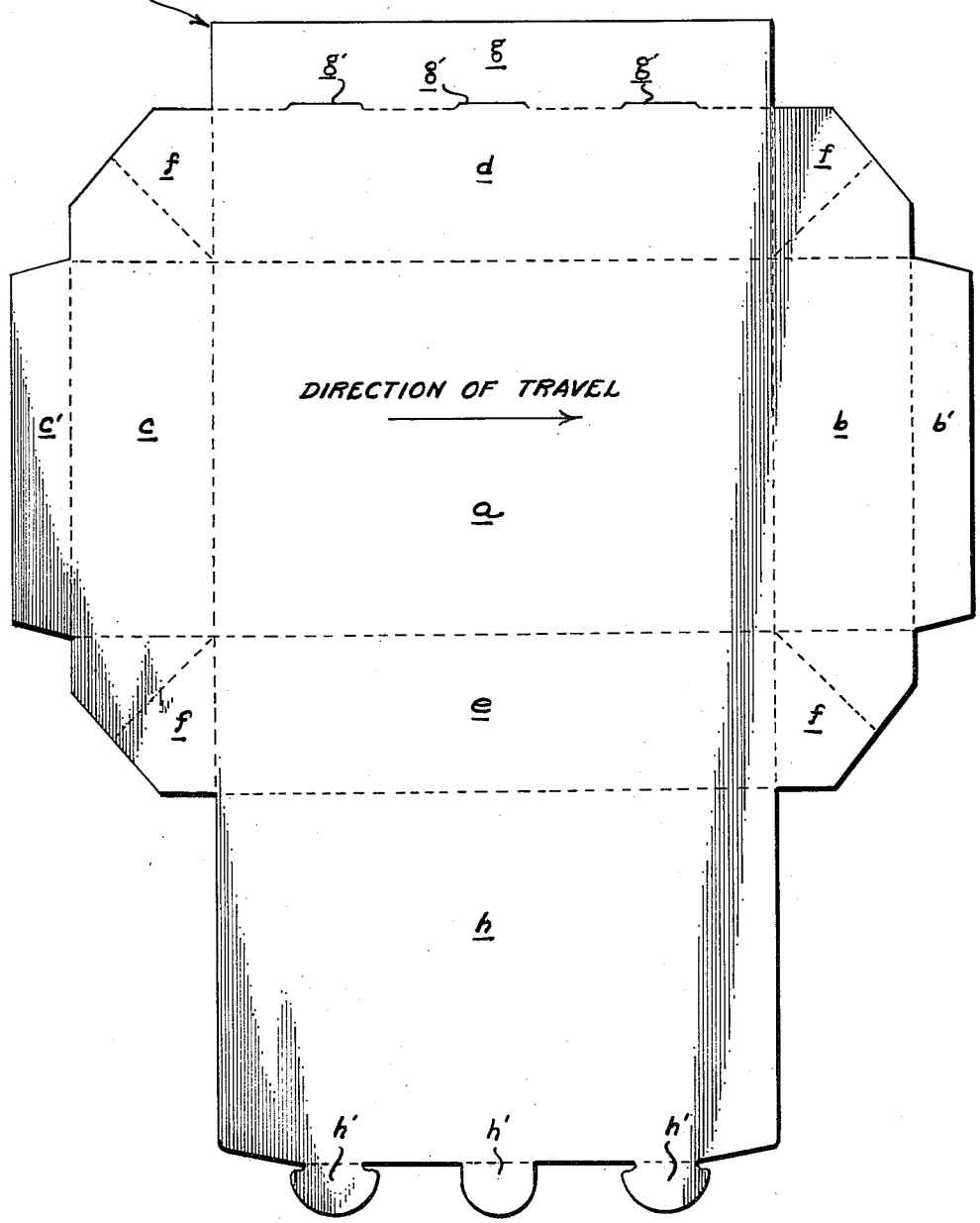

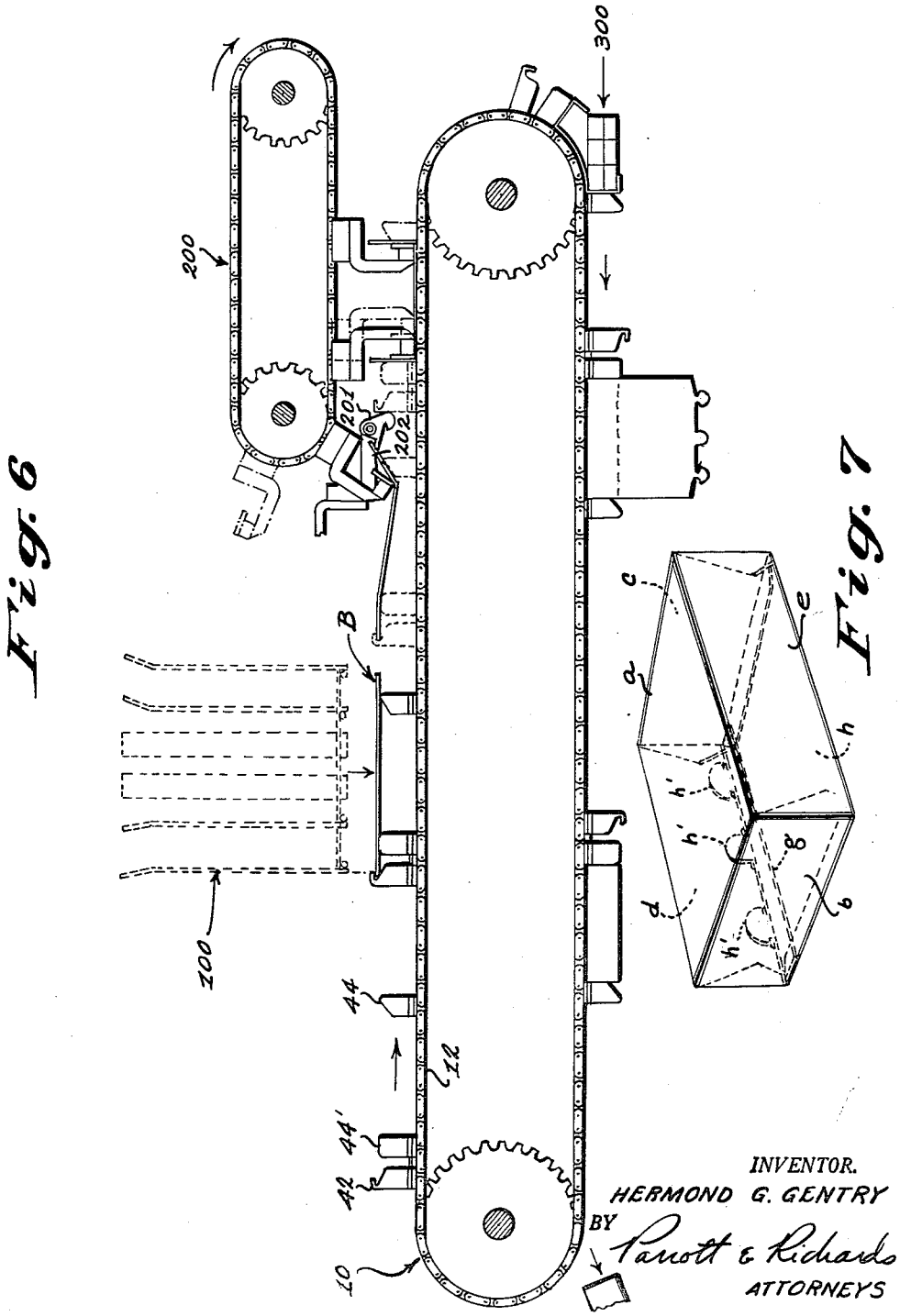

Nov. 20, 1962  H. G. GENTRY  3,064,405
APPARATUS AND METHOD FOR ENCLOSING ARTICLES
IN PAPERBOARD CARTON STRUCTURES
Filed Feb. 19, 1960  10 Sheets-Sheet 7

INVENTOR.
HERMOND G. GENTRY
BY
Parrott & Richards
ATTORNEYS

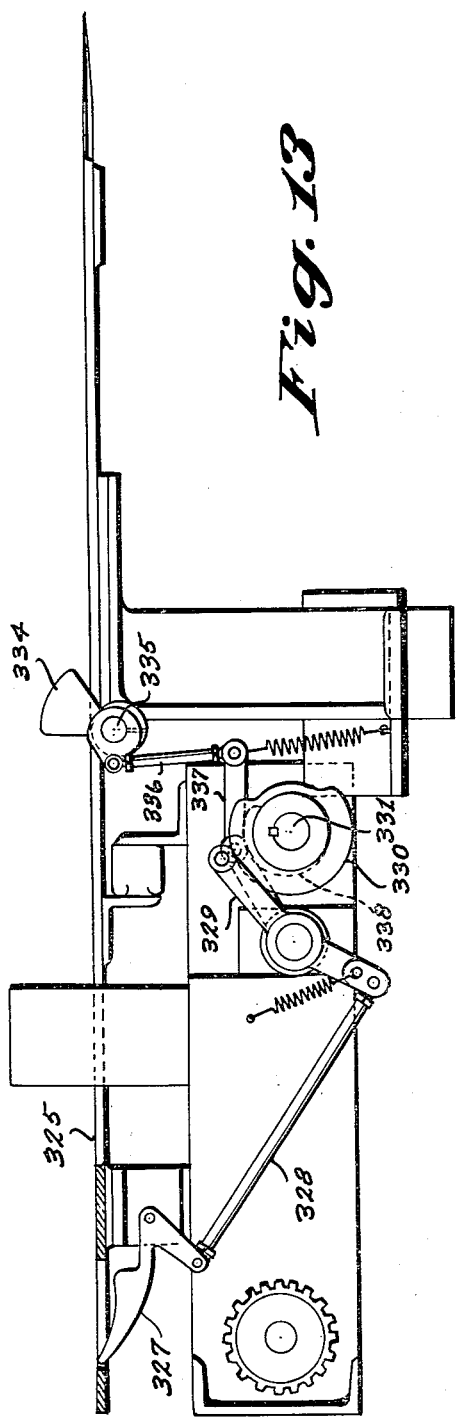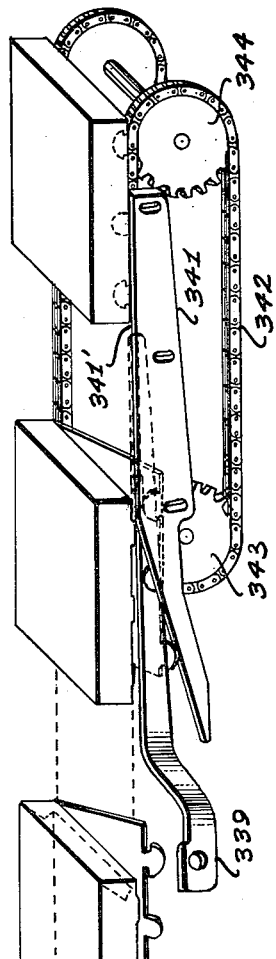
Fig. 13
Fig. 14
INVENTOR.
HERMOND G. GENTRY
BY
Parrott & Richards
ATTORNEYS INVENTOR.
BY HERMOND G. GENTRY
Parrott & Richards
ATTORNEYS

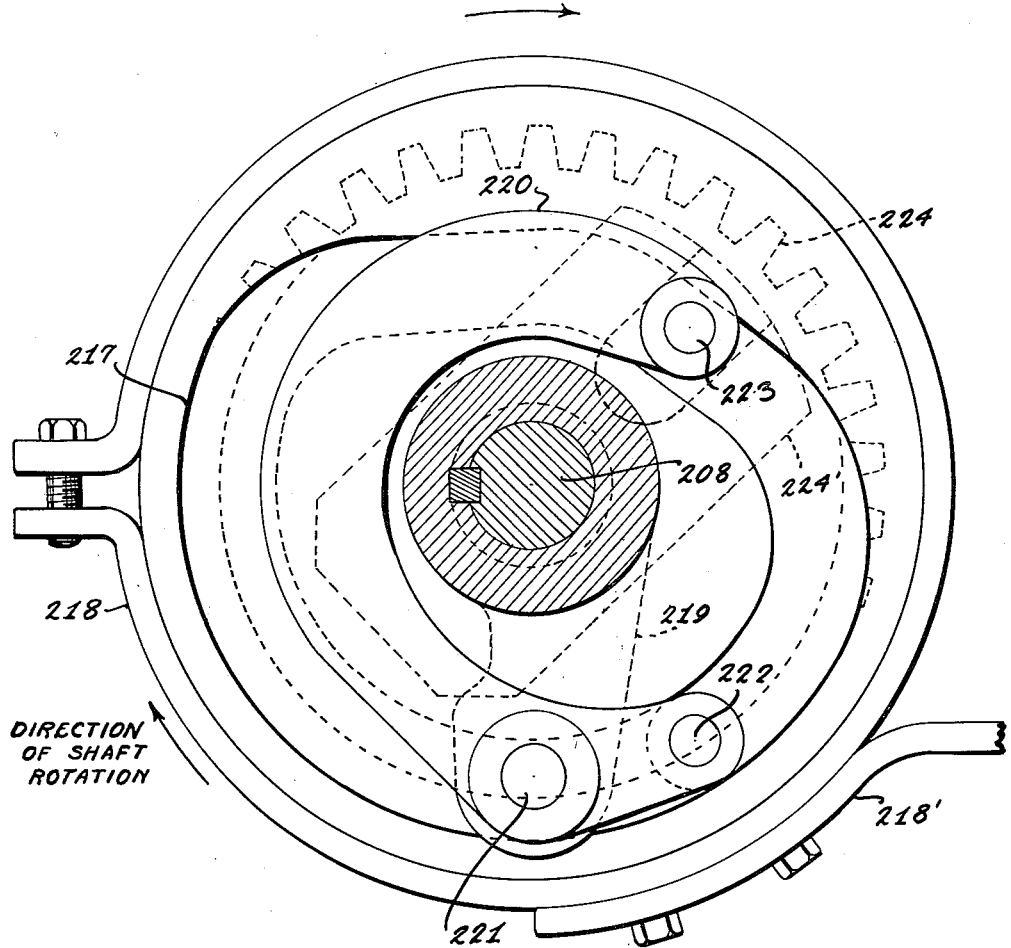

United States Patent Office 3,064,405
Patented Nov. 20, 1962

3,064,405
APPARATUS AND METHOD FOR ENCLOSING ARTICLES IN PAPERBOARD CARTON STRUCTURES
Hermond G. Gentry, Atlanta, Ga., assignor to The Mead Corporation, a corporation of Ohio
Filed Feb. 19, 1960, Ser. No. 9,723
6 Claims. (Cl. 53—195)

This invention relates to the packaging of articles in paperboard carton structures, and more particularly to the packaging of articles in carton structures of the type incorporating four side walls and associated top and bottom walls for enclosing a package group of the articles.

According to the present invention, such packaging is accomplished automatically and in a continuous manner by conveying a blank for the carton structure of the above described type, while erecting the opposed side wall panels thereof that are arranged forwardly and rearwardly with respect to the conveying direction, and then inverting the partially erected carton structure over an assembled package group of the articles to be packaged, and finally erecting the remaining opposed pairs of side wall panels and closing and securing the carton structure to complete a package enclosure of the group of articles being handled.

Briefly described, the apparatus provided by the present invention for carrying out this packaging operation comprises a continuously traveling endless carrier means disposed with upper and lower horizontal reaches; a blank feeding means for placing a carton structure blank on the carrier means at the upper reach thereof with the bottom wall panel of the blank aligned with the carrier means and the blank top wall panel extending laterally thereof; a forming mechanism for erecting, in relation to the bottom wall panel, the forwardly and rearwardly arranged side wall panels at the upper carrier means reach, and associated means for maintaining the erected side wall panels in such relation on the carrier means while moving the partially erected carton structure to the lower carrier means reach, so as to invert the erected side wall panels with respect to the carton bottom wall panel; means operating in timed relation for assembling a package group of the articles being handled, and for feeding the assembled package group beneath the lower carrier means reach to a packaging disposition under the carton structure bottom wall panel aligned thereat, and between the erected side wall panels, as the carton structure blank is moved to this lower reach; and succeeding means at the lower carrier means reach for erecting the remaining opposed side wall panels of the blank in inverted relation and finally closing and securing the top wall panel of the blank beneath the package group of articles to complete the packaging enclosure of the articles by the carton structure.

The apparatus and method of the present invention are adapted particularly for carrying out a packaging operation with a carton structure of the type disclosed and claimed in copending application Serial No. 774,755 filed November 18, 1958, and are described in further detail below in connection with a representative embodiment arranged for handling a carton structure of this sort as illustrated in the accompanying drawings, in which:

FIG. 4 is a further sectional view taken substantially at the line 4—4 in FIG. 1;

FIG. 5 is a plan view of the form of carton structure blank handled by the apparatus shown in FIGS. 1 to 4;

FIG. 6 is a more or less schematic illustration of the succeeding steps by which a carton structure blank, such as is shown in FIG. 5, is developed by the apparatus of the present invention to the package form indicated in FIG. 7;

FIG. 7 is a perspective view indicating the completed package form of a FIG. 5 carton structure blank developed by the apparatus of the present invention;

FIG. 10 is a sectional detail taken substantially at the line 10—10 in FIG. 4;

FIG. 13 is a side elevation detail, partly in section, of lower tucker means provided to facilitate further development of the carton structure about a package group of articles fed thereto; and FIG. 14 is a more or less schematic perspective of the means provided for finally closing and securing the carton structure according to the present invention.

Figure 1:
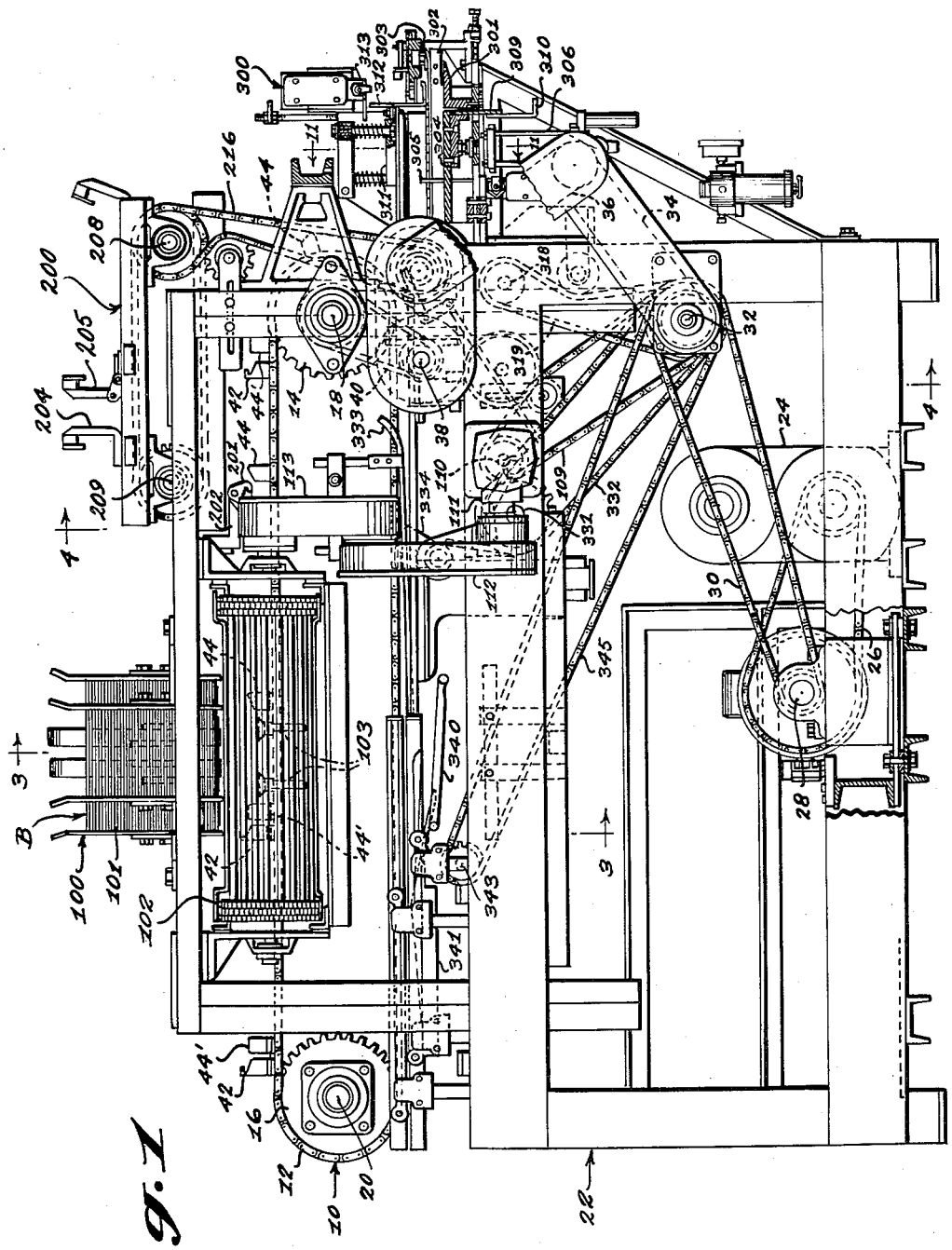
FIG. 1 is a side elevation of apparatus arranged for packaging articles in accordance with the present invention.

Referring now in detail to the drawings, FIG. 5 shows a form of carton structure blank B of the type disclosed in the previously noted copending application Serial No. 774,755 as comprising a bottom wall panel *a* having an opposed pair of side wall panels *b* and *c* foldably hinged at two opposed sides thereof, and a second pair of side wall panels *d* and *e* foldably hinged at the other side edges thereof, with diagonally scored bellows fold corner panels *f* foldably hinged between the respective adjacent ends of the side wall panels *b*, *c*, *d* and *e*. The first mentioned pair of side wall panels *b* and *c* may have flap panels *b'* and *c'* foldably hinged thereon, and one side wall panel *d* of the other opposed pair has a flap panel *g* foldably hinged thereon wtih slots *g'* arranged along the foldably hinged edge thereof for securing cooperation with tabs *h'* arranged at the extending edge of a top wall panel *h* foldably hinged on the opposed side wall panel *e*; the blank B being folded to provide a carton structure by erecting the opposed side wall panels *b* and *c* with respect to the bottom wall panel *a* and folding the flap panels *b'* and *c'* thereon inwardly, then erecting the other pair of side wall panels *d* and *e* while folding the bellows fold corner panels inwardly, and finally disposing the flap panel *g* on the side wall panel *d* inwardly to present the slots *g'* therein for receiving and retaining in securing relation the tabs *h'* on the top wall panel *h* as it is closed to complete the carton structure (see FIG. 7).

The structural arrangement of apparatus embodying the present invention for carrying out a packaging operation with the above described type of paperboard carton structure blank B is illustrated generally in FIGS. 1 to 4 of the drawings, in which the apparatus is shown to be characterized by an endless carrier means, as indicated generally by the reference numeral 10, comprising a pair of sprocket chains 12 extended between respective driven and idler sprocket wheels 14 and 16. The driven and idler sprocket wheels 14 and 16 are carried on mounting shafts 18 and 20 that are journaled, as seen respectively in FIGS. 4 and 2, on a suitable frame structure for the apparatus which is indicated generally by the reference numeral 22.

A main drive motor 24 is mounted at the base of the frame structure 24 with a driving connection 26 running therefrom to a countershaft 28 from which a further driving connection 30 runs to an intermediate drive shaft 32, and from which in turn several connections run for driving the various operating mechanisms of the apparatus as described further below. One of these connections from the intermediate drive shaft 32 comprises a sprocket chain driving train at 34 and 36 arranged through gearing to drive a stub shaft at 38 that is connected at 40 to drive the mounting shaft 18 carrying the driven sprocket wheels 14 and thereby cause continuous travel of the sprocket chains 12 forming the endless carrier means 10.

The continuously traveling endless carrier means 10 is further arranged with regularly spaced sets of positioning and forming lugs 42 and 44 and 44′ fitted in pairs on the pair of carrier means sprocket chains 12. The disposition of the pair of sprocket chains 12 over the driven and idler sprocket wheels 14 and 16 is such as to dispose the carrier means 10 with upper and lower horizontal reaches, and the spaced sets of positioning and forming lugs 42 and 44 and 44′ are fitted on the sprocket chains 12 to assume an upstanding position at the upper carrier means reach, and to be inverted in downwardly extending relation at the lower carrying means reach, for receiving and carrying a paper board blank B through the packaging operation for development to a completed carton structure enclosing a package group of articles in the manner that will now be described below.

In order to provide for placing paperboard blanks B successively on the continuously traveling carrier means 10 at the spaced sets of positioning and forming lugs 42, 44 and 44′, a blank feeding mechanism, as indicated generally by the reference numeral 100, is provided in the form disclosed in detail by copending application Serial No. 839,204, filed September 10, 1959, now U.S. Patent No. 2,973,201, for operation adjacent the starting end of the upper horizontal reach of the carrier means 10. As disclosed in the above noted copending application Serial No. 839,204, the blank feeder 100 comprises a hopper structure formed by upright side guide bars as at 101 arranged for positioning a stacked supply of the paperboard blanks B above a continuously traveling endless chain structure 102 having regularly spaced gaps formed therein through which an edge portion of the lowermost blank B of the stacked supply may be gripped and drawn downwardly for stripping from the supply as the chain structure 101 continues to move.

The blank feeder chain structure 102 is disposed to operate transversely of the carrier means 10 with upper and lower horizontal reaches that are arranged above and below the upper horizontal reach of carrier means 10, so as to place each lowermost paperboard blank B as it is withdrawn from the stacked supply in the path of an oncoming set of carrier means positioning and forming lugs 42, 44 and 44′ to be engaged and advanced thereby through the packaging operation. For this purpose, the blank feeder mechanism 100 incorporates suction cups 103 that are raised and lowered vertically through the spaced gaps in the chain structure 102 to grip an edge portion of the lowermost blank B of the stacked supply and draw it downwardly for stripping by the chain structure 102 in the above noted manner; and further incorporates a pivoted pusher arm mechanism 104 for displacing each completely stripped blank B laterally, from the position at which it is gripped by the suction cups 103, to a supported position between side guiding elements at 105 and 106 and on an intermediate support bar 107, with the blank bottom wall panel *a* aligned with the carrier means chains 12 and disposed at an elevation just above the forming lugs 44 and 44′ and in the path of the positioning lugs 42 of the oncoming set for engagement thereby, and with the blank top wall panel *h* extending laterally to one side.

Vacuum is impressed on the suction cups 103 for performing their gripping function through suitable connections from a vacuum pump and motor set 108 mounted at the base of the frame structure 22 (see FIG. 2), and the drive for the blank feeder mechanism 100 is arranged from the previously mentioned intermediate drive shaft 32 through a driving connection 109 therefrom to a stub shaft at 110 and then through a gear box at 111 to a driving train comprising sprocket chains at 112 and 113 running to the driven shaft 114 for the blank feeder chain structure 102.

Figure 2:
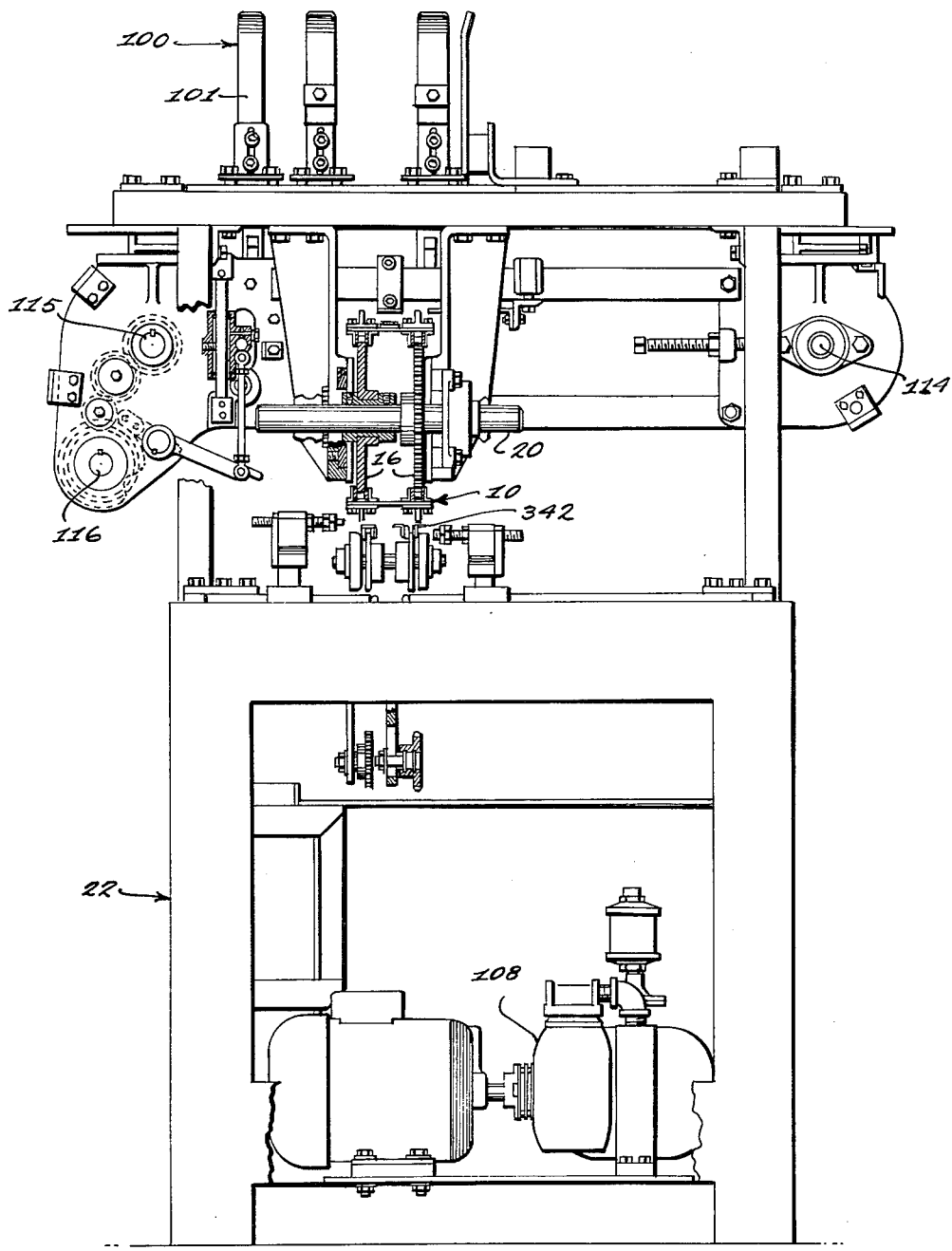
FIG. 2 is a left end elevation corresponding generally to FIG. 1, but partly broken away and partly sectioned.

The related idler shaft 115 for the chain structure 102 is in turn connected through a gear train, as illustrated in FIG. 2, to drive a cam shaft 116 from which the operation and application of vacuum to the suction cups 103, and the operation of the pivoted pusher arm mechanism 104, are actuated in timed relation to the continuous travel of the chain structure 102, which is in turn continuously driven in timed relation to the continuously traveling carrier means 10, all as illustrated and described at length in the above noted copending application Serial No. 839,204, to which reference is made for further details.

As each paperboard blank B is received from the blank feeder mechanism 100 on the continuously traveling carrier means 100 at a particular set of positioning and forming lugs 42, 44 and 44′, the positioning lugs 42 act to engage the trailing or rearwardly arranged edge of the blank B and advance it towards the discharge end of the upper horizontal reach of the carrier means 10 with the blank B resting on the forming lugs 44 and 44′ for partial folding development of the blank B, as illustrated diagrammatically in FIG. 6, by an overhead tucker mechanism indicated generally by the reference numeral 200. Shortly after this advance of the blank B on carrier means 10 commences the leading or forwardly arranged edge thereof is engaged by a prebreaker finger 201 pivoted on a mounting bracket 202 to cause through this engagement a prebreaking of the hinged connection of the leading or forwardly arranged blank side wall panel *b* with the bottom wall panel *a*, just as a leading tucking arm structure 204 acts to press the blank B downwardly at this hinged connection to tuck the leading side wall panel B against the forming lugs 44 and thereby fold the leading side wall panel *b* to an erect position on the carrier means 10.

Figure 9:
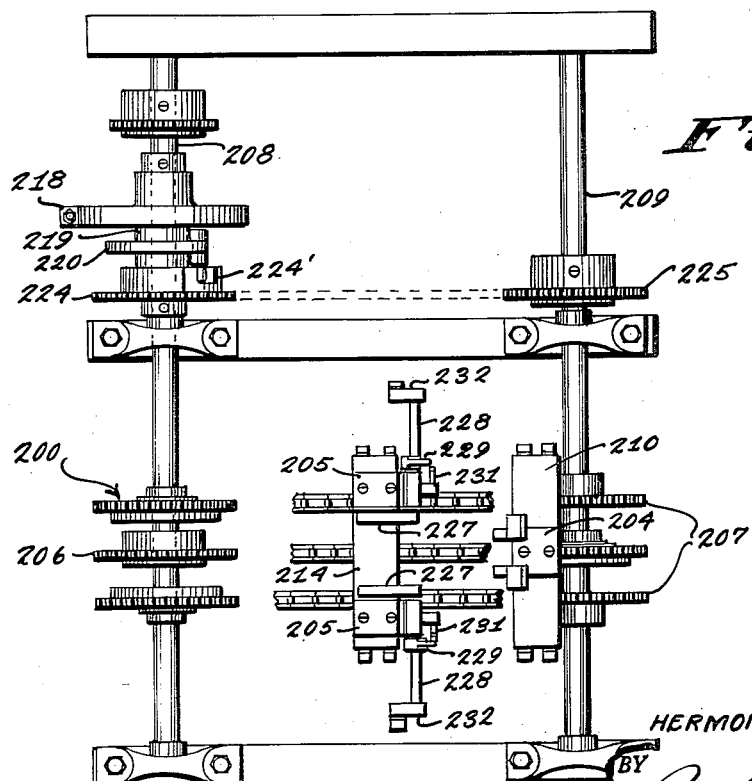
FIG. 9 is a plan detail corresponding generally to FIG. 8.

For this purpose, the leading tucker arm structure 204 is arranged to travel continuously in spaced sets with trailing tucker arm structures 205 (see FIGS. 1, 4, 8 and 9) on respective sprocket chain arrangements 206 and 207 disposed over sprocket wheel mounting shafts 208 and 209. The sprocket chain arrangement 206 for the leading tucker arm structures 204 comprises a single sprocket chain on which transverse carrier bars 210 (compare FIGS. 4 and 9) are fitted to ride at their extending ends in a lower support track 211 and on upper support bars 212 for stabilizing the leading tucking arm structures 204, which are mounted on the carrier bars 210 and have a yoke-shaped form with foot plates 213 carried at the extending end of each leg thereof for pressing directly on the blank B to perform the above noted tucking action against the leading forming lugs 44.

The trailing tucker arm structures 205, forming a set with each leading tucker arm structure 204, are carried by the other previously mentioned sprocket chain arrangement 207 which comprises a pair of sprocket chains arranged on either side of the first mentioned sprocket chain arrangement 206 and independently fitted with transverse carrier bars 214 (compare FIGS. 4 and 9) that again extend at their ends to ride on the upper support bars 212 and in the lower support tracks 211 for stabilizing the trailing tucker arm structures 205, which face oppositely with respect to the leading tucker arm structures 204 and incorporate laterally spaced arm portions fitted at their extending ends with foot plates 215 for tucking action to fold the trailing or rearwardly arranged side wall panel c of each blank B to an upright position against the trailing forming lugs 44' on the carrier means 10. The trailing tucker arm structure 205 of each set is initially brought into play on the blank B at a spacing with respect to the leading tucker arm structure 204 that is substantially less than the spacing between the leading and trailing forming lugs 44 and 44', and is then actuated differentially to increase its spacing from the leading tucker arm structure 204 to complete its tucking action at the trailing forming lugs 44' for erecting the trailing side wall panel c.

This differential actuation of the trailing tucker arm structure 205 is obtained through the drive arrangement to the overhead tucker mechanism 200 which comprises a driving connection at 216 taken off from the previously described drive for the carrier means 10 and running to the sprocket wheel mounting shaft 208 for operating the tucker sprocket chain arrangements 206 and 207 continuously in timed relation with respect to the carrier means 10. The sprocket wheel mounting shaft 208 serves as the driving shaft for the sprocket chain arrangement 206 and as an idler shaft for the sprocket chain arrangement 207, and is fitted with a cam mechanism through which the other sprocket wheel mounting shaft 209 is differentially operated to serve as a driving shaft for the sprocket chain arrangement 207 while acting as an idler shaft for the sprocket chain arrangement 206.

The cam mechanism (see FIGS. 8, 9 and 10) for differentially actuating the sprocket mounting shaft 209 comprises a face cam member 217 disposed to ride on the sprocket wheel mounting shaft 208 in idling relation so that it may be held at a fixed position by a peripheral clamp member 218 arranged on a support bracket 218' to allow rotative adjustment of the cam member 217 therein to set the phase relation thereof for the desired differential action. Adjacent the cam member 217, a radial yoke member 219 is fixed on the sprocket wheel mounting shaft 208 for rotation therewith, and the yoke member 219 carries a cam arm 220 pivoted thereon at 221, with one end of the cam arm 220 arranged in following relation at 222 in the raceway of the face cam member 217, and the other end engaging at 223 a radial slot in the hub of a sprocket wheel 224 riding freely on the sprocket mounting shaft 208 and having a sprocket chain connection 225' to a sprocket wheel 225 fixed on the sprocket mounting shaft 209.

As a result of this arrangement, the rotation of the radial yoke member 219 by the sprocket mounting shaft 208 causes the cam arm 220 pivoted thereon to drive the sprocket wheel 224 and in turn to drive the sprocket wheel 225 for rotating the other sprocket mounting shaft 209 and thereby operating the sprocket chain arrangement 207 on which the trailing tucker arm structures 205 are carried. However, the following action of the pivoted cam arm 220 at the raceway of the face cam member 217 results in rocking the cam arm 220 with respect to the radial yoke member 219 and thereby cyclically changing the relative rotation of the sprocket wheel 224 with respect to the mounting shaft 208 on which it is carried, which means that the driven rotation of the other mounting shaft 209 will in turn be cyclically changed in relation to that of the mounting shaft 208, and that the respective sprocket chain arrangements 206 and 207 will likewise be differentially actuated so as to impose periodically on the sprocket chain arrangement 207 a retarding action in relation to the sprocket chain arrangement 206. This retarding action causes the trailing tucker arm structures 205 periodically to drop behind, while the leading tucker arm structures 204 continue to advance at their normal rate, and in this way to lengthen the spacing between the respective tucker foot plates 213 and 215 to correspond with the spacing between the leading and trailing forming lugs 44 and 44' and thereby complete the erection of both the leading and trailing side wall panels b and c on the continuously traveling carrier means 10.

In the course of the above described partial erection of the carton structure by the overhead tucker mechanism 200, the flap members b' and c' carried by the respective side wall panels b and c are additionally folded to their enwardly disposed position. The inward folding of the flap member b' on the leading side wall panel b is accomplished by a guide member 226 that extends horizontally and centrally above the path of the carrier means 10 at a level such as to force the flap member b' backwardly to its inwardly disposed position as it passes thereunder with the side wall panel b held in erect position against the leading forming lugs 44. Comparable inward folding of the trailing flap members c', which must be accomplished forwardly, is provided for by tucker fingers 227 associated with the trailing tucker arm structures 205 on rock shafts 228 that also carry rock arms 229 from which tension springs 230 extend to anchor pins 231 on the tucker arm structures 205 for normally biasing the rock shaft 228 to maintain the tucking fingers 227 extending rearwardly with respect to the trailing tucker arm structures 205 and aligned in parallel relation with the path of the sprocket chain arrangement 207.

The rock shafts 228 also carry operating arms 232 at their outwardly extending ends, that are arranged for riding cam bars 233 disposed in relation to the lower horizontal reach of the sprocket chain arrangement 207 so that, after the trailing tucker arm structures 205 have been differentially actuated to complete the erection of the trailing side wall panel c against the trailing forming lugs 44', the cam bars 233 will cause pivoting of the rock shafts 228 through the operating arms 232 and against the bias of the tension springs 230 to pivot the rearwardly extending tucker fingers 227 downwardly for folding forwardly the trailing flap member c' to its intended inward disposition with respect to the erected trailing side wall panel c, and will hold the inwardly folded flap c' at this position until it advances beneath the previously mentioned guide member 226, under which the leading flap member b' will already have been folded. The guide member 226 is arranged, as seen best in FIG. 8, so that it continues in a concentric arc with respect to the carrier means mounting shaft 18 for maintaining the flaps b' and c' folded, and otherwise tending to hold the partially erected carton structure on the carrier means 10, as the adjacent forming lugs 44 and 44' continue to move from the upper horizontal carrier means reach about the sprocket wheels 14 to the lower horizontal reach thereof.

In addition, auxiliary guide bars 234 are comparably arranged at each side of the carrier means 10 (compare FIGS. 4 and 8) to have the laterally extending portions of the blank B ride thereagainst on pulley members 235 mounted freely on the carrier means mounting shaft 18, and held against rotation by brackets 235', to support the laterally extending blank portions within the auxiliary guide bars 234 and thereby stabilize the movement of the partially erected blanks as they are transferred from the upper to the lower reach of the carrier means 10.

As the partially erected carton structure is transferred in the above noted manner from the upper to the lower reach of the carrier means 10, the erected leading and trailing side wall panels b and c are, by reason of this transfer, inverted in relation to the bottom wall panel a, and the apparatus of the present invention operates to insert a package group of the articles being handled beneath the bottom wall panel a and between the erected side wall panels b and c as this inversion takes place. For this purpose, an article feeding mechanism, as indicated generally by the reference numeral 300 (see FIGS. 1 and 4) is mounted on the apparatus frame structure 22 for operation adjacent the starting end of the lower reach of carrier means 10.

The article feeding mechanism 300 is arranged to receive an incoming supply of the articles to be packaged as delivered serially by any suitable form of feeding conveyor (not shown). The articles to be packaged may be of any type adapted for enclosure by a carton structure of the type formed from the paperboard blank B and they will generally be of rectangular form, such as Eskimo pies, or bars of soap, or the like. To receive the incoming supply of articles, the article feeding mechanism 300 incorporates a fixed bottom guide plate 301 on which the incoming supply of articles are delivered between suitable side guide strips 302 and beneath a top guide structure 303.

Figure 11:
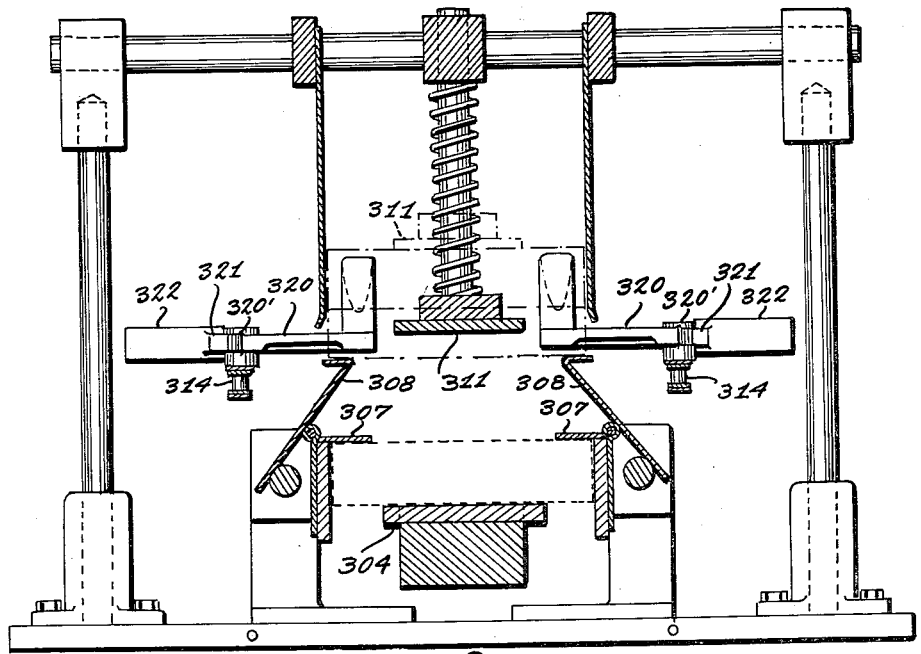
FIG. 11 is a sectional detail of the article feeding mechanism taken substantially at the line 11—11 in FIG. 1.

The feeding pressure of the incoming supply causes the articles to feed through this entrance guiding arrangement so as to advance from the bottom guide plate 301 onto a lifting platform 304 until the leading article being fed actuates a micro switch trip arm 305 set to feel the presence on the lifting platform 304 of the number of articles desired in a package layer for enclosure in the carton structure. From this sensing by the micro switch trip arm 305 an air cylinder 306 is actuated to raise the lifting platform 304, and thereby effect an upward displacement of the package group layer of articles thereon. During this upward displacement, the layer of articles is initially held in place on the lifting platform 304 by a pair of hinged top guide plates 307 which are biased for bearing downwardly in opposition to upward displacement of the platform supported articles, but which yield upwardly as the lifting platform 304 is elevated. Further elevation of the lifting platform 304 causes the articles thereon also to displace and pass upwardly between a pair of hinged upper track guides 308 which are likewise yieldably biased for such displacement, but which recover to a supporting disposition beneath the raised layer of articles as soon as the lifting platform elevates them sufficiently. (See FIG. 11.)

The lifting platform 304 is fitted with a vertical face plate at 309 at which the remaining incoming supply of articles is held off during the elevation of the platform 304, and this face plate 309 carries a trip bracket 310 depending therefrom for tripping a further suitably disposed micro switch (not shown) for actuating the return stroke of the air cylinder 306 to lower the lifting platform 304 to its original position for receiving another layer of articles thereon. Above the upper track guides 308 a holddown structure 311 is arranged for bearing downwardly on each elevated layer of articles while yielding vertically to allow their elevation. If more than one layer of articles is desired in the package groups to be inserted in the carton structure, the above described operation of the lifting platform 304 is repeated and the holddown structure 311 continues to yield upwardly to accommodate the number of layers desired. The holddown structure 311 also carries a micro switch trip bracket at 312 for actuation of a micro switch 313 which may be set vertically for tripping when the holddown structure 311 has been displaced upwardly by the number of layers desired in the package group. When the micro switch 313 is actuated in this manner it disables the lifting platform 304, so that it cannot operate again until the assembled package group of articles has been fed from beneath the holddown structure 311.

The feeding of each assembled package group of articles is accomplished by a pair of side feed chains 314 arranged between idler sprockets at 315 and driven sprockets at 316, the sprockets 316 being driven through bevel gear connections at 317 with a shaft 318 to which a driving connection runs at 319 from the previously mentioned intermediate drive shaft 32. The side guide chains 314 each carry at least one feeder arm 320 that is pivoted thereon at 320' with a follower arm portion 321 trailing angularly therefrom to reach past and inside of an upstanding stop pin 321' spaced adjacently on the respective chains 314 and by which the feeler arms 320 are prevented from pivoting substantially forward of an outwardly extending position perpendicular to the side feed chains 314, so as to be maintained, during the idler portion of their travel on the feed chains 314, in proper relation to be positioned readily for feeding action during their working travel. The positioning of the feeder arms 320 for feeding action is effected by cam bars 322 that extend parallel to the upper track guides 308 with a grooved edge face in which the follower arm portions 321 ride to brace the feeder arms 320 in perpendicular relation to the side feed chains 314 as they sweep over the upper track guides 308 to feed an assembled package groups of articles therefrom.

Figure 12:
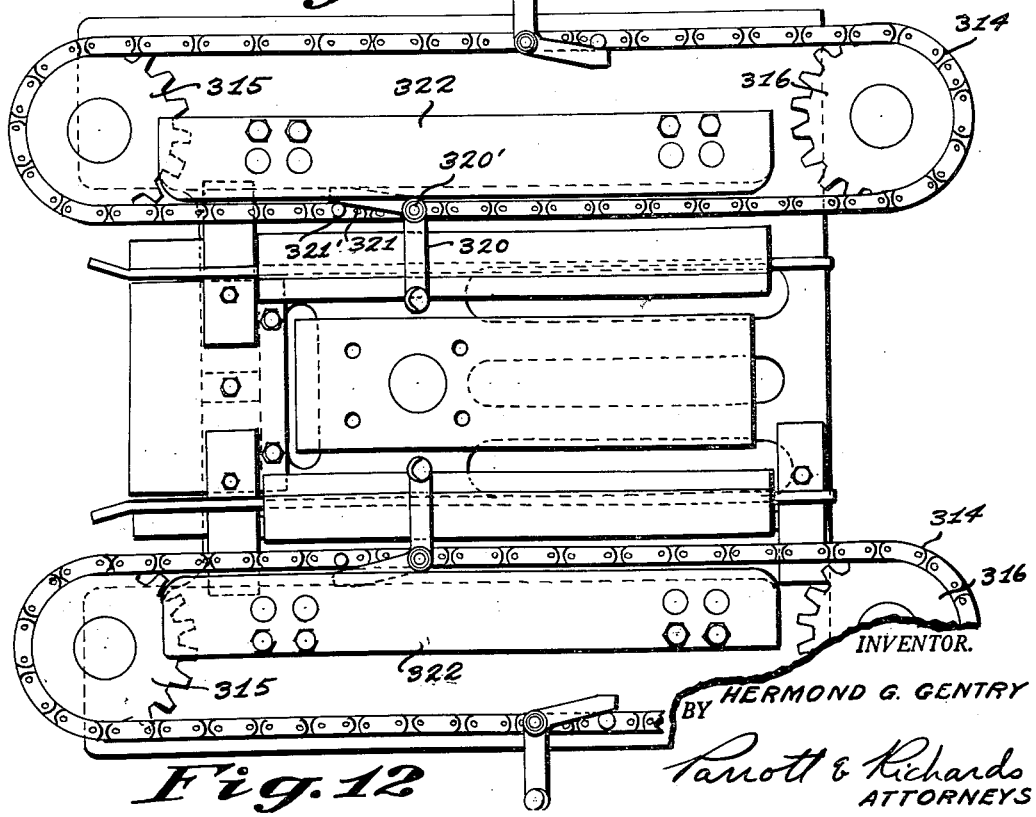
FIG. 12 is a plan detail showing the feeding arrangement for the assembled package groups of articles being handled.

In the illustrated embodiment, each side feed chain 314 is fitted in regularly spaced relation with two of the feeder arms 320 in the above noted relation (see FIG. 12), and the side feed chains 314 may each be further fitted with suitable trip lugs (not shown) spaced in relation to each feeder arm 320 for displacing a micro switch actuating arm (not shown), while each feeder arm 320 is sweeping over the upper track guides 308 during its working stroke, to signal the completion of each working stroke and allow subsequent operation of the lifting platform 304 that was disabled at the micro switch 313 by the holddown structure 311.

The assembled package group of articles that is fed from the upper track guides 308 in this manner is delivered therefrom onto a bottom support bar 325 aligned below the lower horizontal reach of the carrier means 10, so as to receive the assembled package group of articles thereat in timed relation to the transfer of a partially erected carton structure from the upper to the lower reach of the carrier means 10 for insertion of the assembled package group of articles being fed within the partially erected carton structure. The drive to the side feed chains 314 is arranged to operate at a sufficiently faster rate than that of the carrier means 10 so as to allow the leading erect side wall panel b to move beneath the starting end of the lower carrier means reach and then cause the assembled package group to catch up and seat thereat as it is fed.

To facilitate this feeding insertion of the assembled package group of articles beneath the carton structure bottom wall panel a and against the leading erected side wall panel b pressure bars 326 are arranged at each side of the bottom support bar 325 adjacent its entrance end with an initial disposition slightly above the level of the bottom support bar 325 to press the incoming package group of articles upwardly against the carbon structure bottom wall panel a and lead the first article in the bottom layer of the package group over the inwardly folded flap b' on the leading side wall panel b to insure the proper insertion thereat. Likewise, provision is made for similarly completing the enclosure of the rear face of the inserted package group of articles by the trailing erected side wall panel c and the flap c' thereon through a tucker finger 327 pivoted below the bottom support bar 325 to operate through a slotted entrance end thereof so as to rise in timed relation above the level of the bottom support bar 325 and raise the last article in the bottom layer of the package group of articles being fed as well as guide thereunder the inwardly disposed flap c' on the trailing erected side wall panel c. The tucker finger 327 is oscillated in timed relation for this purpose through a linkage indicated at 328 to a pivoted follower arm 329 which rides a cam 330 carried on a shaft at 331 that is driven through a connection at 332 from the intermediate drive shaft 32.

With a package group of articles inserted beneath the carton structure bottom wall panel a and between the erected leading and trailing side wall panels b and c in the above noted manner, the continued travel of the carrier means 10 along its lower reach acts to advance the carton structure and the inserted package group of articles as a unit, with the side wall panel *d* and flap *g* thereon extending laterally to one side of the carrier means 10 and the remaining side wall panel *e* and the top wall panel *h* thereon extending laterally to the other side so as to pass beneath side folding bars as indicated at 333 that commence the downward folding of these portions of the paperboard blank B about the package group of articles. As this downward side folding is commenced, it is necessary to break the diagonal fold in the corner panels *f* so that they will assume an inwardly disposed bellows fold relation in the carton structure when the side folding is completed, and further corner tucking fingers 334 are mounted for oscillation on a rock shaft 335 through a linkage at 336 to a follower arm 337 riding an actuating cam 338 that is also carried on the previously mentioned cam shaft 331.

The action of the corner tucking fingers 334 is to break inwardly the diagonal folds of the corner panels *f* by being disposed in the path thereof, the oscillation of corner tucker fingers 334 being timed so that their oscillating cycle causes them to move in the opposite direction at this time to the travel of the carrier means 10 along its lower reach and thereby to move downwardly in this opposite direction after the initial breaking of the leading corner panels *f* is accomplished to cause their inward folding. As the leading portion of the carton structure advances onward, the oscillation of the corner tucker fingers 334 then reverses to rock the fingers 334 in the direction of travel of the carrier means 10 along its lower reach with a timing such that the fingers 334 rise behind the trailing corner panels *f* rapidly enough to press thereon for breaking the diagonal folds therein forwardly so that the further folding thereof continues inwardly in bellows fold relation to the carton structure as the downward folding of the side walls *d* and *e* is completed by the side folding bars 334.

Figure 3:
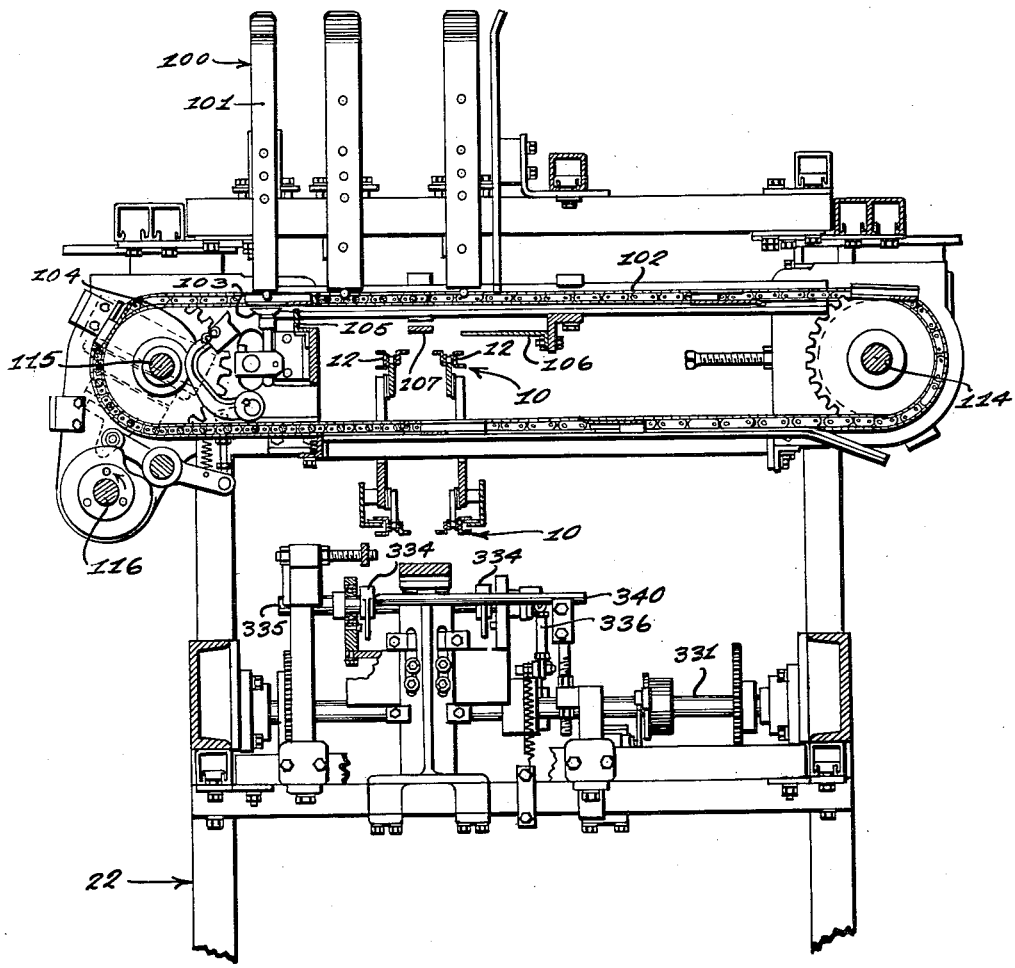
FIG. 3 is a sectional view taken substantially at the line 3—3 in FIG. 1.
Figure 8:
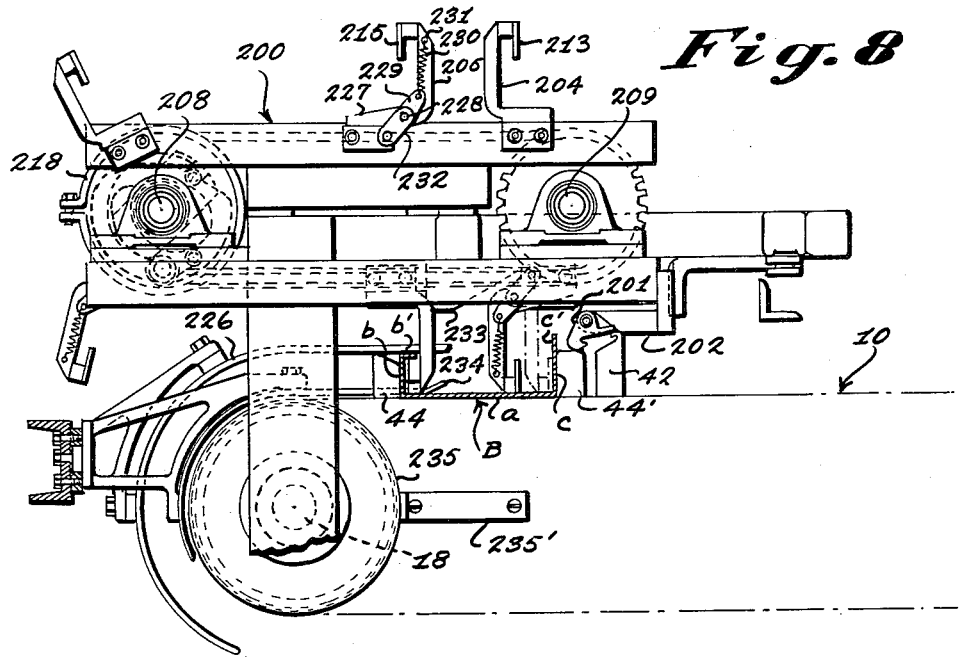
FIG. 8 is an enlarged detail of the overhead tucker mechanism substantially as seen from the line 8—8 in FIG. 4.

As this side folding is completed, the flap member *g* on the side wall panel *d* is folded inwardly by a bottom folding guide at 339 (see FIG. 14) and the inward folding of the top wall panel *h* on the side wall panel *e* is commenced towards overlapping relation by a bottom folding bar 340 (see FIGS 1 and 3). As the inward folding of the flap *g* on the side wall panel *d* is completed it rides up on a side locking guide 341 and the tabs *h'* on the top wall panel *h* are folded upwardly by this same locking guide and directed into the locking slots *g'* in the flap *g*, the locking guide 341 having a narrowed top edge portion at 341' that cause the tab portions extending from the side wall panel *b* as the slots *g'* are opened by inward folding of the flap *g* to ride outwardly thereof and thereby direct from the inward face thereof the insertion of the locking tab *h'* in the slots *g'*. The actual insertion of the locking tabs *h'* in the slots *g'* is accomplished by a bottom chain support structure 342 arranged with a rising reach from a driven sprocket wheel shaft 343 to an idler sprocket wheel shaft 344, a driving connection 345 being provided to the shaft 343 from the intermediate drive shaft 32. Whereupon, the packaged group of articles may be discharged from the machine in any suitable manner with the carton structure completely erected and secured thereabout in the form illustrated in FIG. 7.

The present invention has been described in detail above for purposes of illustration only and is not intended to be limited by this description or otherwise except as defined in the appended claims.

I claim:

1. Apparatus for packaging articles in a paperboard carton structure incorporating four wall panels and top and bottom panels associated for enclosing a package group of said articles, said apparatus comprising a continuously traveling endless carrier means disposed with upper and lower horizontal reaches, means for placing a blank for said paperboard carton structure on said carrier means at the upper reach thereof with said blank having a bottom panel aligned with said carrier means reaches, means for erecting with respect to said bottom panel forwardly and rearwardly arranged opposed wall panels of said blank on said carrier means at said upper reach, means for maintaining said forwardly and rearwardly arranged wall panels in erect relation on said carrier means while moving said carton structure blank to the lower reach thereof and thereby inverting said erected forwardly and rearwardly arranged wall panels and said bottom panel, means for assembling a package group of said articles and feeding said assembled package group beneath said carrier means lower reach and in covered relation under the blank bottom panel aligned therewith and between said erected forwardly and rearwardly arranged wall panels as said carton structure blank is moved to said lower reach for subsequent enclosing of said assembled package group in said carton structure, means at said lower carrier means reach for erecting opposed side wall panels of said blank in inverted position, and means for closing and securing a top panel of said blank to enclose said package group of articles in said carton structure.

2. Apparatus for packaging articles in a paperboard carton structure formed for enclosing a package group of said articles with a bottom panel having four wall panels hinged thereon in opposed pairs and a top panel foldably hinged on one of said wall panels and arranged for securing at an opposite wall panel, said appartus comprising a continuously traveling endless carrier means disposed with upper and lower horizontal reaches, means for placing a blank for said paperboard carton structure on said carrier means at the upper reach thereof with said blank having a bottom panel aligned with said carrier reaches and a top panel extending laterally of said upper reach, means operable at said upper carrier means reach for erecting with respect to said bottom panel forwardly and rearwardly arranged opposed wall panels of said blank while traveling on said carrier means, means for maintaining said forwardly and rearwardly arranged wall panels in erect relation on said carrier means while moving said carton structure blank to the lower reach thereof and thereby inverting said erected forwardly and rearwardly arranged wall panels and said bottom panel, means for assembling a package group of said articles and feeding said assembled package group beneath and in covered relation under the bottom panel of said blank at said lower carrier means reach and between said erected forwardly and rearwardly arranged wall panels as said carton structure blank is moved to said lower reach for subsequent enclosing of said assembled package group in said carton structure, means at said lower carrier means reach for erecting laterally extending opposed side wall panels of said blank in inverted position, said top panel extending from one of said side wall panels, and means for closing and securing the top panel of said blank beneath said package group of articles to enclose said articles in said carton structure.

3. Apparatus for packaging articles in a paperboard carton structure completely enclosing said articles, said apparatus comprising an endless carrier conveyor chain structure disposed with horizontal upper and lower reaches and fitted with spaced sets of positioning and forming lugs, means for driving said chain structure continuously; means adjacent the starting portion of the upper horizontal reach of said chain structure for placing paperboard blanks for said carton structure thereon at each set of said positioning and forming lugs while said chain structure is driven continuously; means adjacent the discharge portion of the upper horizontal reach of said chain structure for forming the forwarding and rearwardly positioned side walls of said carton structure as carried on said chain structure to an erect upright position at said forming lugs; means for assembling a package group of said articles adjacent the initial portion of the lower horizontal reach of said chain structure; means for maintaining said carton structure on said chain for travel from said upper to said lower reach to invert said carton structure; means for feeding each assembled package group of said articles beneath said lower horizontal chain structure reach in timed relation for disposition within said partially erected blank and with said erected side walls thereover and positioned for subsequent enclosure within said carton structure; means for erecting downwardly the sidewise positioned side walls of said carton structure as the travel thereof continues along the lower horizontal reach of said chain structure; and means for closing and securing the top wall of said carton structure to enclose said articles completely during continuing travel thereof to the discharge end of the lower horizontal reach of said chain structure.

4. Apparatus as defined in claim 1 and further characterized in that said means for erecting said forwardly and rearwardly arranged opposed wall panels comprises differentially actuated forming elements operating first to press said forwardly arranged wall panel to erect position, then to press said rearwardly arranged wall panel to erect position, and finally to withdraw said forming elements after delivery of said carton structure to means for maintaining its partially erect position.

5. Apparatus as defined in claim 1 and further characterized in that said means for assembling and feeding a package group of said articles comprises means for feeding each package group at a rate faster than the travel of said carrier means to provide for delivering said package group against said forwardly arranged wall panel, and related means for seating said fed package group at said forwardly arranged wall panel and for guiding said rearwardly arranged wall panel thereabout.

6. Apparatus as defined in claim 1 and further characterized in that said means for closing and securing the top panel of said blank comprises a guide element directing the closing and securing manipulation and an endless chain structure arranged with a rising reach to effect said closing and securing.

References Cited in the file of this patent

UNITED STATES PATENTS

| | | |
|---|---|---|
| 906,291 | Robb | Dec. 8, 1908 |
| 1,818,496 | Milmoe | Aug. 11, 1931 |
| 1,976,211 | Bickford | Oct. 9, 1934 |
| 2,603,047 | Malhiot | July 15, 1952 |
| 2,697,313 | Wilcox | Dec. 21, 1954 |
| 2,803,933 | Patin | Aug. 27, 1957 |
| 2,935,832 | Mischke | May 10, 1960 |
| 2,939,258 | Anness | June 7, 1960 |

UNITED STATES PATENT OFFICE
CERTIFICATE OF CORRECTION

Patent No. 3,064,405                          November 20, 1962

Hermond G. Gentry

It is hereby certified that error appears in the above numbered patent requiring correction and that the said Letters Patent should read as corrected below.

Column 4, line 28, for "100" read -- 10 --; column 5, line 47, for "24" read -- 224 --; line 49, for "225'" read -- 224' --; column 10, line 70, for "forwarding" read -- forwardly --.

Signed and sealed this 25th day of June 1963.

(SEAL)
Attest:

ERNEST W. SWIDER
Attesting Officer

DAVID L. LADD
Commissioner of Patents